US012241434B2

(12) United States Patent
Caldwell et al.

(10) Patent No.: US 12,241,434 B2
(45) Date of Patent: Mar. 4, 2025

(54) HYDROGEN FUEL SYSTEM

(71) Applicant: Caterpillar Inc., Peoria, IL (US)

(72) Inventors: Curtis J Caldwell, Metamora, IL (US); Seth Ost, Tucson, AZ (US); Brian Kacynski, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 42 days.

(21) Appl. No.: 18/228,869

(22) Filed: Aug. 1, 2023

(65) Prior Publication Data

US 2025/0043752 A1 Feb. 6, 2025

(51) Int. Cl.

*B60L 50/75* (2019.01)
*E02F 9/08* (2006.01)
*F02M 21/02* (2006.01)

(52) U.S. Cl.

CPC ....... *F02M 21/0206* (2013.01); *E02F 9/0883* (2013.01); *F02M 21/0221* (2013.01); *F02M 21/0239* (2013.01); *F02M 21/0242* (2013.01); *F02M 21/0293* (2013.01)

(58) Field of Classification Search

CPC ............... F02M 21/0206; F02M 21/02; F02M 21/0221; F02M 21/0224; F02M 21/0242; F02M 21/0293

See application file for complete search history.

(56) References Cited

U.S. PATENT DOCUMENTS

| | | | | |
|---|---|---|---|---|
| 6,446,616 | B1 * | 9/2002 | Kabat | F02M 37/20 123/527 |
| 7,992,670 | B2 * | 8/2011 | Richter | F02M 25/12 136/205 |
| 8,783,281 | B2 | 7/2014 | Carter | |
| 10,221,816 | B2 | 3/2019 | Perez | |
| 2014/0373531 | A1 | 12/2014 | Wong | |
| 2022/0196323 | A1 * | 6/2022 | Montgomery | F25J 1/0254 |
| 2022/0302708 | A1 * | 9/2022 | Kumazawa | H02J 7/0069 |
| 2022/0376284 | A1 * | 11/2022 | Johnson | C25B 1/04 |
| 2023/0023222 | A1 * | 1/2023 | Kwon | B60L 58/33 |

(Continued)

FOREIGN PATENT DOCUMENTS

| | | | |
|---|---|---|---|
| CN | 114516272 A | * | 5/2022 |
| CN | 115483700 A | * | 12/2022 |
| JP | 2005038832 A | * | 2/2005 |

(Continued)

*Primary Examiner* — George C Jin
*Assistant Examiner* — Teuta B Holbrook

(57) ABSTRACT

A hydrogen fuel system for a work machine is disclosed. The hydrogen fuel system comprises a hydrogen storage tank containing hydrogen, the hydrogen being at least one of a liquid hydrogen or a gaseous hydrogen; a hydrogen power unit configured to consume the hydrogen from the hydrogen storage tank, the hydrogen power unit including at least one of a plurality of fuel cells or a hydrogen combustion engine; a boil-off pressure relief valve in fluid communication with the hydrogen storage tank; and a tank pressure sensor in communication with the boil-off pressure relief valve. The boil-off pressure relief valve is configured to, when the tank pressure sensor detects a pressure inside the hydrogen storage tank that exceeds a boil-off pressure threshold, vent the gaseous hydrogen to a boil-off fuel line fluidly connected to the hydrogen power unit.

20 Claims, 8 Drawing Sheets

(56) References Cited

U.S. PATENT DOCUMENTS

2023/0108882 A1 * 4/2023 Montgomery ......... F25J 1/0025
62/48.2

FOREIGN PATENT DOCUMENTS

| | | | | |
|---|---|---|---|---|
| JP | 4050019 | B2 | * | 2/2008 |
| JP | 4748381 | B2 | * | 8/2011 |
| JP | 2022131896 | A | * | 9/2022 |
| KR | 100969009 | B1 | | 7/2010 |
| KR | 20210044015 | A | * | 4/2021 |
| KR | 102540213 | B1 | * | 6/2023 |
| KR | 20230101462 | A | * | 7/2023 |
| WO | 2022231169 | A1 | | 11/2022 |

* cited by examiner

HYDROGEN FUEL SYSTEM

TECHNICAL FIELD

The present disclosure generally relates to hydrogen fuel systems, and more particularly relates to hydrogen-powered fuel systems with improved fuel conservation.

BACKGROUND

Hydrogen ("H2") power units such as fuel cells, hydrogen fueled internal combustion engines, and their associated fuel storage systems play a significant role in the pursuit of clean and efficient energy solutions. Liquid hydrogen storage, also referred to as cryogenic hydrogen storage or cyro-compressed storage, is one method used to store and conserve hydrogen for hydrogen-powered applications. A hydrogen fuel cell is an electrochemical device that converts the chemical energy stored in hydrogen fuel into electricity, with water as a byproduct. Fuel cells operate through a redox reaction between hydrogen and oxygen, typically using a proton exchange membrane (PEM) or an alkaline electrolyte. A hydrogen internal combustion engine, on the other hand, operates similarly to a traditional internal combustion engine but uses hydrogen as the fuel instead of gasoline or diesel.

Liquid hydrogen storage involves cooling hydrogen gas to very low temperatures (−253° C. or 20 K) to convert it into a liquid state which is more energy dense than gaseous hydrogen, allowing for more hydrogen to be stored in a given volume. Liquid hydrogen is typically stored in specialized cryogenic tanks with insulation to minimize heat transfer and evaporation. Cryogenic tanks may be vacuum-insulated to minimize evaporation losses and contain pressure relief devices as a safety precaution to prevent over pressurization and avoid explosions.

When hydrogen fuel is not being drawn from the storage tank, such as when a machine is inactive or in sleep-mode, evaporation of liquid hydrogen occurs due to environmental conditions, resulting in increasing pressure within the tank. The pressure within the tank is generally released by venting gaseous hydrogen to the atmosphere, causing a waste of hydrogen fuel.

Others have attempted to develop a system that consumes gaseous hydrogen fuel but fails to disclose a method of conserving hydrogen when a machine is inactive. For example, Korean Application KR100969009 (hereinafter referred to as "the '009 reference") discloses a battery charging device of a fuel cell vehicle that stores hydrogen supplied to generate electricity. The battery charging device is configured to activate a fuel cell when a pressure sensor reaches a pressure threshold to vent vaporized hydrogen gas to be consumed. However, the '009 reference fails to provide a system for conserving hydrogen fuel while a machine is inactive, in sleep-mode, and stopped at night, or for extended periods of sleep states such as greater than 3 days.

It can therefore be seen that a need exists for conserving gaseous hydrogen formed when evaporation of liquid hydrogen occurs in a hydrogen storage tank for a hydrogen fuel system.

SUMMARY

In accordance with one aspect of the disclosure, a hydrogen fuel system for a work machine is disclosed. The hydrogen fuel system comprises a hydrogen storage tank containing hydrogen, the hydrogen being at least one of a liquid hydrogen and a gaseous hydrogen; a hydrogen power unit configured to consume the liquid hydrogen and the gaseous hydrogen from the hydrogen storage tank, the hydrogen power unit chosen from one of a plurality of fuel cells and a hydrogen combustion engine; a boil-off pressure relief valve in fluid communication with the hydrogen storage tank; and a tank pressure sensor in communication with the boil-off pressure relief valve. The boil-off pressure relief valve is configured to vent the gaseous hydrogen to a boil-off fuel line hydraulically connected to the hydrogen power unit when the tank pressure sensor detects a pressure inside the hydrogen storage tank that exceeds a boil-off pressure threshold.

In accordance with another aspect of the disclosure, a work machine is disclosed. The work machine comprises a frame; ground engaging elements supporting the frame; a battery supported by the frame; a plurality of machine operational systems each having a plurality of system batteries; and a hydrogen fuel conservation system. The hydrogen fuel conservation system includes: a hydrogen storage tank mounted in the frame and containing hydrogen, the hydrogen being at least one of a liquid hydrogen and a gaseous hydrogen; a hydrogen power unit mounted in the frame and in fluid connection with the hydrogen storage tank and configured to consume the liquid hydrogen and the gaseous hydrogen, the hydrogen power unit chosen from one of a plurality of fuel cells and a hydrogen combustion engine; a tank pressure sensor in the hydrogen storage tank; a controller in communication with the tank pressure sensor and the plurality of machine operational systems; and a boil-off pressure relief valve in fluid communication with the hydrogen storage tank and in electrical communication with the tank pressure sensor. The boil-off pressure relief valve is configured to vent the gaseous hydrogen to a boil-off fuel line hydraulically connected to the hydrogen power unit when the tank pressure sensor detects a pressure inside the hydrogen storage tank that exceeds a boil-off pressure threshold. The boil-off fuel line is configured to transfer the gaseous hydrogen to the hydrogen power unit for consumption of the gaseous hydrogen to produce electric energy for powering and recharging the battery and the plurality of system batteries.

In accordance with another aspect of the disclosure, a method for conserving hydrogen fuel in a hydrogen fuel system for a work machine is disclosed. The method comprising the following steps: providing a hydrogen storage tank in fluid connection with a hydrogen power unit chosen from one of a fuel cell and a hydrogen internal combustion engine, the hydrogen storage tank containing at least one of a liquid hydrogen and a gaseous hydrogen; installing a boil-off pressure relief valve in communication with the hydrogen storage tank, configured to vent gaseous hydrogen, for relieving pressure within the hydrogen storage tank, to a boil-off fuel line in fluid communication with the boil-off pressure relief valve and the hydrogen power unit; and transferring the gaseous hydrogen to the hydrogen power unit, via the boil-off fuel line, for hydrogen fuel consumption and production of electric power by the hydrogen power unit, while the work machine is in an inactive or operational state.

These and other aspects and features of the present disclosure will be better understood upon reading the following detailed description when read in conjunction with the accompanying drawings.

Figure 1:
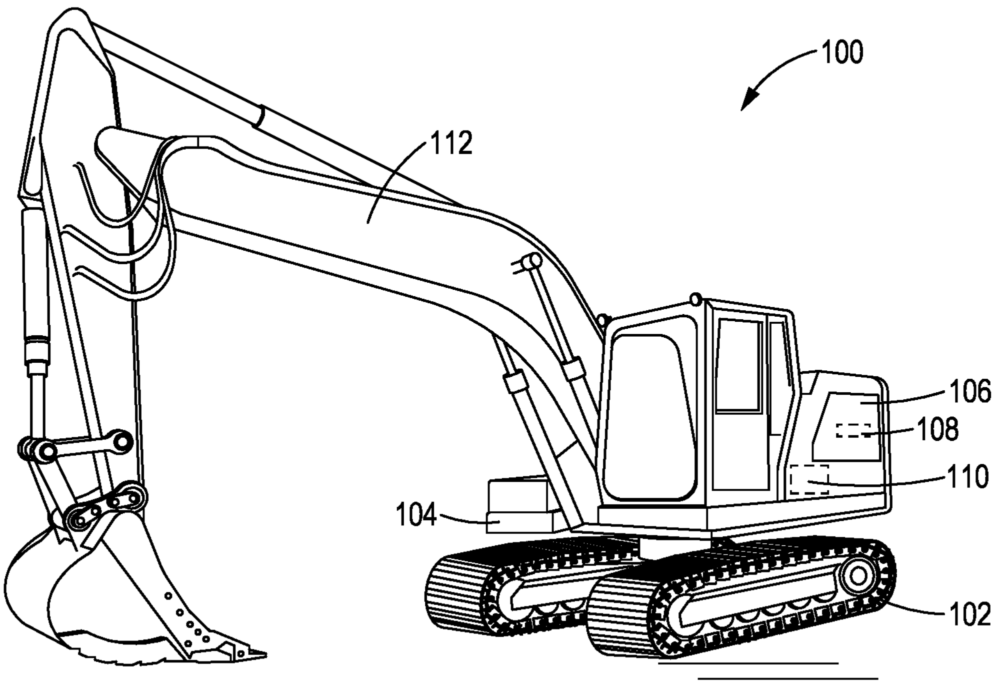
FIG. 1 is a perspective view of a work machine, according to an embodiment of the present disclosure.

The figures depict one embodiment of the presented disclosure for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to the depicted example, a work machine 100 is shown, illustrated as an exemplary excavator. Excavators are heavy mobile equipment designed to move earth material from the ground or landscape at a dig site in the construction and agricultural industries. While the following detailed description describes an exemplary aspect in connection with the excavator, it should be appreciated that the description applies equally to the use of the present disclosure in other mobile and stationary work machines, including, but not limited to, generators, backhoes, front-end loaders, shovels, draglines, skid steers, wheel loaders, and tractors, as well.

Referring now to FIG. 1, the work machine 100 comprises ground engaging elements 102, illustrated as continuous tracks, that support a frame 104. It should be contemplated that the ground engaging elements 102 may be any other type of ground engaging elements 102 such as, for example, wheels, etc. The work machine 100 further includes a H2 power unit 106, a battery 108, and a H2 storage tank 110 mounted on the frame 104. The machine may include a work implement 112 extending from the frame 104 for conducting work, such as, for example, excavating landscapes or otherwise moving earth, soil, or other material at a dig site. The frame 104 may have an upper swiveling body common with excavators and work machines in the agricultural and construction industries. The H2 power unit 106 may be provided as a plurality of fuel cells, a fuel cell stack, or as a H2 combustion engine, as generally known in the arts. The H2 storage tank 110 may be provided in or on the frame 104 for storing liquid hydrogen, cryo-compressed hydrogen, or cryogenic hydrogen fuel for the work machine 100.

Figure 2:
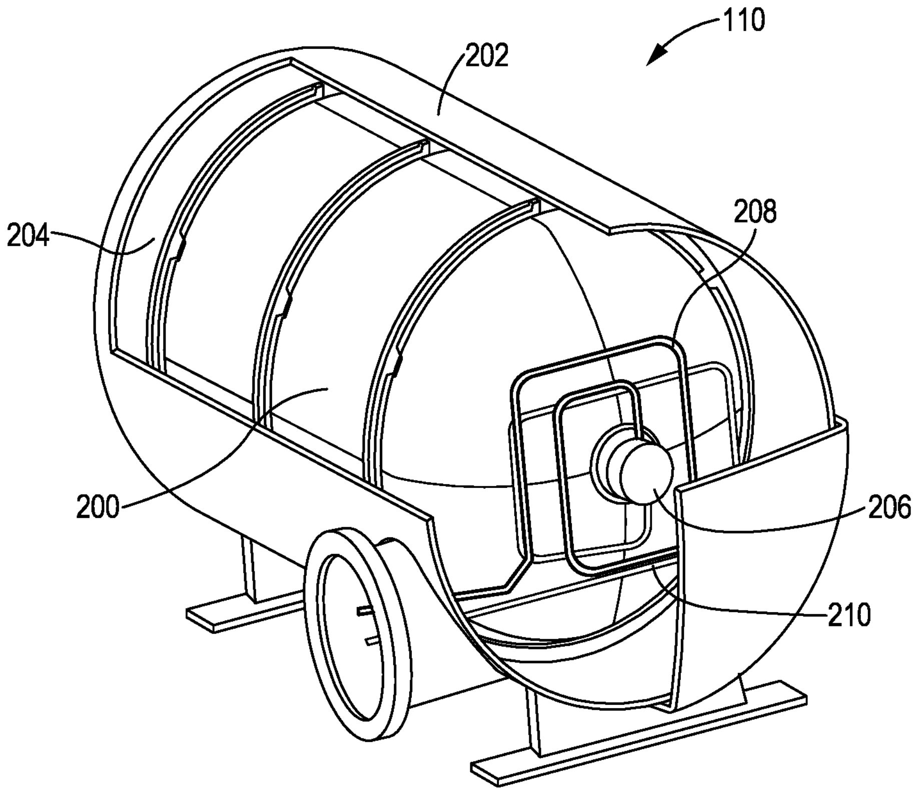
FIG. 2 is a perspective cut-away view of a H2 storage tank for use in a work machine, according to an embodiment of the present disclosure.

Now referring to FIG. 2, a perspective cut-away view of the H2 storage tank 110 is illustrated, according to one embodiment of the disclosure. The H2 storage tank 110 may be constructed with high-strength materials, such as stainless steel, carbon fiber reinforced composites, or aluminum alloys, that provide sufficient strength and insulation properties. The H2 storage tank 110 may include a high-pressure vessel 200 which may be made of carbon-fiber, steel, or other suitable high-strength material capable of high-pressure storage, as generally known in the arts.

The H2 storage tank 110 may also include a shell 202 which may surround the high-pressure vessel 200 forming a double-walled structure with an annular space 204 in the dual wall structure. The shell 202 may be made of a high-strength material, such as stainless steel, to provide the necessary strength and insulation properties. The H2 storage tank 110 may also include a valve 206, a gaseous H2 outlet line 208 for releasing H2 gas, and a liquid H2 fill line 210 for filling liquid hydrogen into the H2 storage tank 110. Cryogenic pumps designed for transferring liquid hydrogen from storage fill tanks to the H2 storage tank 110 may be utilized to prevent hydrogen boil-off during the transfer process.

Figure 3:
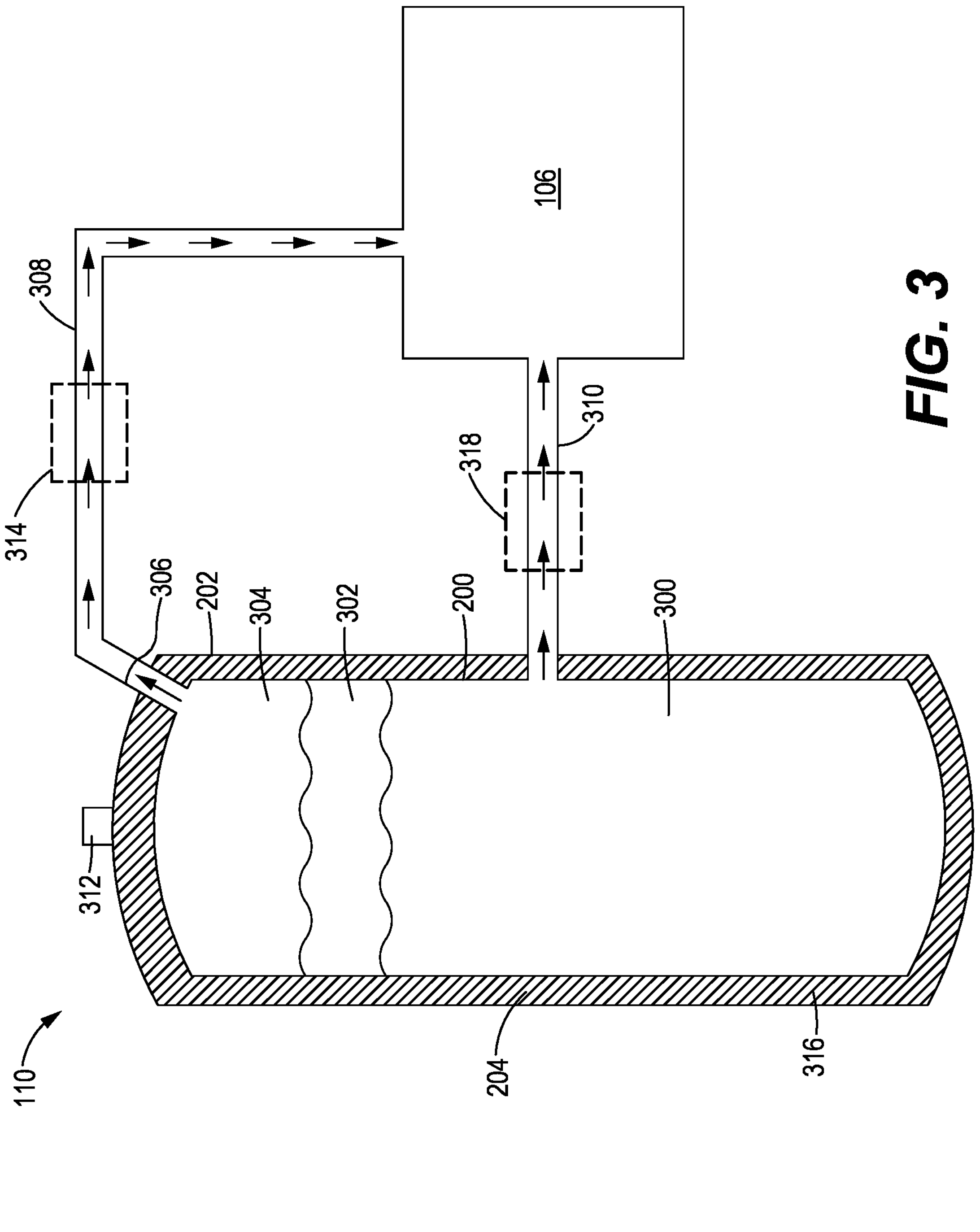
FIG. 3 is a schematic representation of an H2 storage tank of FIG. 2 in connection with a hydrogen power unit, according to an embodiment of the present disclosure.

Now referring to FIG. 3, a schematic of the H2 storage tank 110 of FIG. 2 connected to the H2 power unit 106 is illustrated, according to one embodiment of the disclosure. The H2 storage tank 110 includes liquid hydrogen 300, which may also be a cryogenic hydrogen fuel, or a cryo-compressed hydrogen. Liquid hydrogen 300 has a tendency, in some instances, due to varying pressures, temperatures, and environmental conditions, to boil-off into a liquid-gaseous hydrogen phase 302, and a gaseous hydrogen 304. The H2 storage tank 110 may include a boil-off pressure relief valve 306 for releasing an amount of gaseous hydrogen 304 when the pressure in the H2 storage tank 110 exceeds a boil-off pressure safety threshold when gaseous hydrogen 304 volume increases.

Liquid hydrogen 300 boils-off into gaseous hydrogen 304 when the liquid hydrogen 300 changes states into gaseous hydrogen 304 due to varying pressures, temperatures, and environmental conditions of the work machine 100. The boil-off pressure relief valve 306 is fluidly connected to the H2 power unit 106 via a boil-off fuel line 308. The H2 power unit 106 consumes the gaseous hydrogen 304 received from the boil-off fuel line 308 to prevent waste of the hydrogen fuel from boil-off conditions.

The H2 storage tank 110 provides the liquid hydrogen 300 to the H2 power unit 106 through a liquid fuel line 310 during normal operation of the work machine 100. The liquid fuel line 310 may be fluidly of hydraulically connected to the H2 power unit 106 to consume the liquid hydrogen 300 stored in the H2 storage tank 110.

The H2 storage tank 110 may also have a second pressure relief valve 312 for emergency pressure relief of gaseous hydrogen 304 into the atmosphere, if the pressure within the H2 storage tank 110 exceeds an emergency pressure relief threshold. The boil-off fuel line 308 may optionally include a hydrogen condenser 314 to liquify the gaseous hydrogen 304 prior to being provided to the H2 power unit 106 for a higher density energy form of hydrogen and for more efficient consumption of the gaseous hydrogen 304 that has been boiled-off. There may also be an evaporator 318 provided on the H2 storage tank 110 for instances where liquid hydrogen 300 were to exit the H2 storage tank 110 via the liquid fuel line 310. Additionally, the evaporator 318 may be used to warm the gas up from the near cryogenic temperatures inside the H2 storage tank 110, and provided on the boil-off fuel line 304.

The annular space 204 may contain an insulation material 316 between the shell 202 and the high-pressure vessel 200. Providing the insulation material 316 in the annular space 204 reduces heat transfer and evaporation of cryogenic hydrogen. The insulation in the annular space 204 may include multiple layers of high-performance insulation materials, including aerogel blankets and vacuum-sealed panels, or a vacuum insulation configured in a double-walled H2 storage tank, to minimize heat transfer and improve conservation, as generally known in the arts.

When the work machine 100 is inactive or in a sleep-state, the liquid hydrogen 300 may change states into gaseous hydrogen 304 in significant quantities. The boil-off pressure relief valve 306 may be configured to vent the gaseous hydrogen 304 to the boil-off fuel line 308 for consumption by the H2 power unit 106 to avoid waste of gaseous hydrogen 304 while the work machine 100 is inactive, in sleep-mode, or shut down. While the work machine 100 is inactive, the H2 power unit 106 may be activated when the boil-off pressure threshold is exceeded for consumption of the gaseous hydrogen 304 provided via the boil-off fuel line 308 to produce electric energy without wasting potential electrical energy by venting the gaseous hydrogen 304 through the second pressure relief valve 312.

Figure 4:
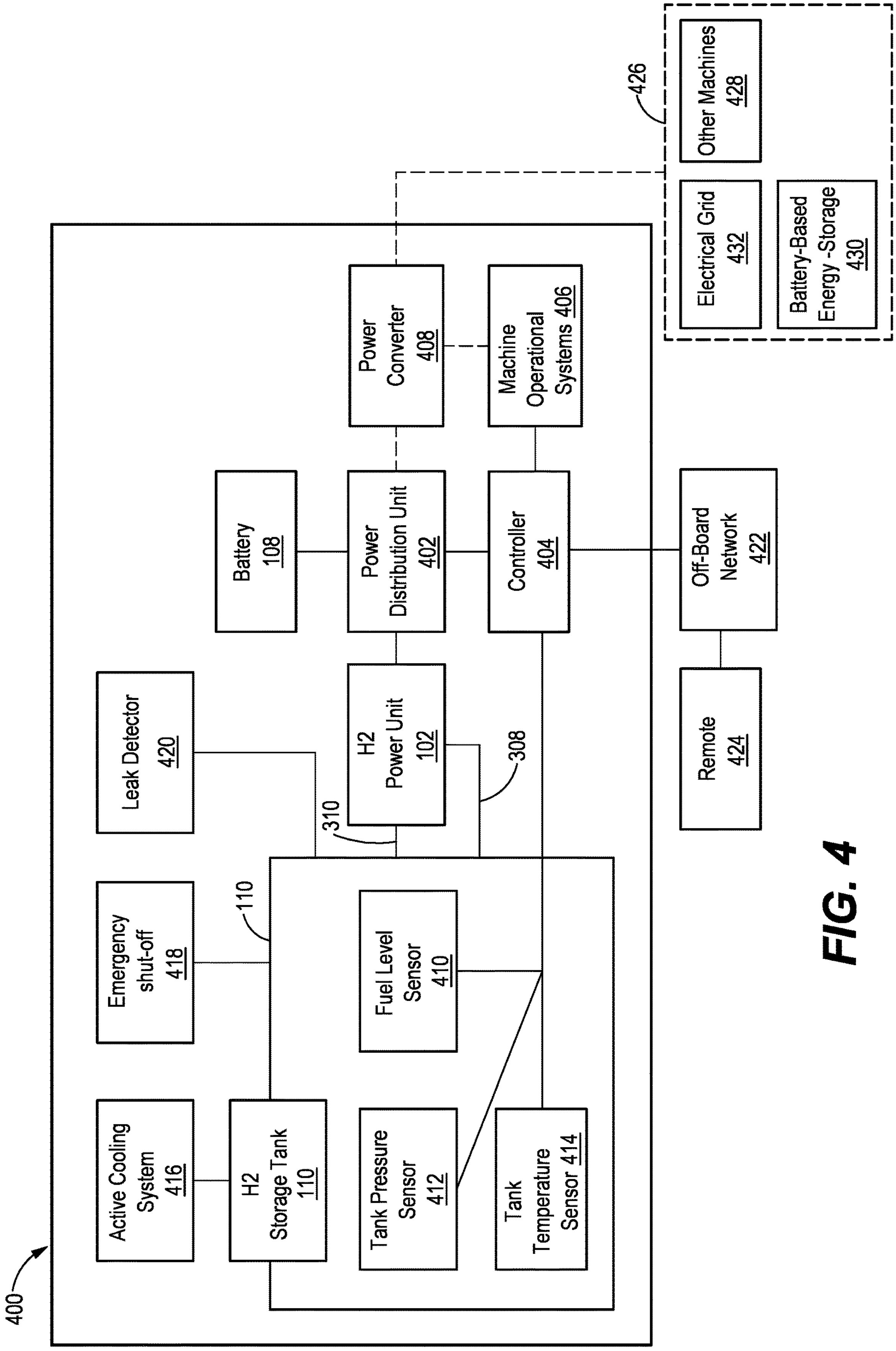
FIG. 4 is a schematic diagram of a H2 fuel system in the work machine of FIG. 1, according to an embodiment of the present disclosure.

Now referring to FIG. 4, a schematic of a H2 fuel system 400 is illustrated, according to one embodiment of the disclosure. The H2 fuel system 400 may comprise the H2 power unit 106, the H2 storage tank 110, a power distribution unit 402 ("PDU 402"), and a controller 404. The H2 power unit 106 may be hydraulically connected to the H2 storage tank 110 for consuming the liquid hydrogen 300 and the gaseous hydrogen 304. The H2 power unit 106 converts hydrogen fuel into electrical energy and supplies the electrical energy to the PDU 402.

The PDU 402 is further connected to the battery 108 and machine operational systems 406. There may be a first power converter 408 that converts electrical energy into a desired form or specific load of electrical energy before providing to the PDU 402 and/or a specific operational system in the work machine 100. The power generated by the H2 power unit 106 can be transferred to the power distribution unit 402 and can be utilized to recharge the battery 108, electrically power the machine operational systems 406, and/or electrically power other systems of the work machine 100. The power converter 408 may be a High Voltage to Low Voltage power converter. Additionally, the low voltage setting may be set to a system voltage, as required, generally either 12V or 24V.

The PDU 402 may be a basic, metered, monitored, switched, ATS, rack-mounted, modular, or a high-density power distribution unit, selected for specific power distribution and management needs in various applications. The PDU 402 may include features such as multiple outlets, metering capabilities, remote monitoring and control, redundancy, rack compatibility, customization, and high outlet density to suit diverse equipment and environmental requirements. The machine operational systems 406 may each be powered by a plurality of system batteries (not shown) which may be rechargeable batteries, as generally known in the arts.

The controller 404 in the work machine 100 may control the machine operational systems 406 associated with the work machine 100. The machine operational systems 406 may be one of many operating systems found within a work machine 100 such as an ignition system, a fuel injection system, an oil transport system, a transmission, a throttle system, a power system, a braking system, a cooling system, a navigation system, a lighting system, an alarm system, a battery system, and/or an engine or other propulsion system, as generally known in the arts. These systems may also include one or more hydraulic, mechanical, electronic, and software-based components in which the controller 404 may communicate with and control, as generally known in the arts. The controller 404 may embody a single microprocessor or multiple microprocessors that include a means for controlling various operations in the work machine 100. The microprocessors may be configured to perform the functions of the controller 404. The controller 404 may be embodied in a general machine microprocessor capable of controlling numerous machine functions. The controller 404 may include a memory, a secondary storage device, a processor, and any other components for running an application as well as storing the collection of data and the signals received.

The H2 storage tank 110 may include a fuel level sensor 410 for measuring the amount of hydrogen fuel remaining in the H2 storage tank 110, a tank pressure sensor 412 for measuring pressure in the H2 storage tank 110, and a tank temperature sensor 414 for monitoring temperatures in the H2 storage tank 110. The fuel level sensor 410 may be a fuel float sensor which may utilize a floatation device or float that moves up and down with the liquid fuel level in the H2 storage tank 110. As the fuel level sensor 410 moves, it may communicate a fuel level signal to the controller 404 indicating a fuel level remaining of liquid H2, over time.

The H2 storage tank 110 may be connected to an active cooling system 416, an emergency shut-off system 418, and/or a leak detector system 420, as generally known in the arts. The active cooling system 416 may employ active cooling techniques for maintaining the low temperatures required for liquid hydrogen storage, as generally known in the arts. The emergency shut-off system 418 may automatically isolates the cryogenic fluid supply in the H2 storage tank 110, and may activate a fire suppression system upon detecting a fire or abnormal operating conditions, as generally known in the arts.

The controller 404 may be connected to an off-board network 422. The controller 404 and the off-board network 422 may communicate with each other, whereby a remote 424 may be connected to the off-board network 422 for controlling the machine operational systems 406 remotely. The remote 424 may be a computer, laptop, mobile phone, tablet, or the like, that may access the off-board network 422 through a website, URL, app, or the like, as generally known in the arts. The remote 424 may be used to communicate with the controller 404, via the off-board network 422, to control, activate, or deactivate the machine operational systems 406 within the work machine 100. The controller 404 may also have digital interfaces that allow for integration with various monitoring and control systems in the work machine 100, and further operable via the remote 424.

External devices 426 may be connected to the work machine 100 such as a vehicle, another work machine, an electrical grid, or any device that requires charging. The electric energy produced by the H2 power unit 106 may be utilized for charging one or more batteries associated with other machines 428, charging a battery-based energy storage system 430, or powering an electrical grid 432.

Figure 5:
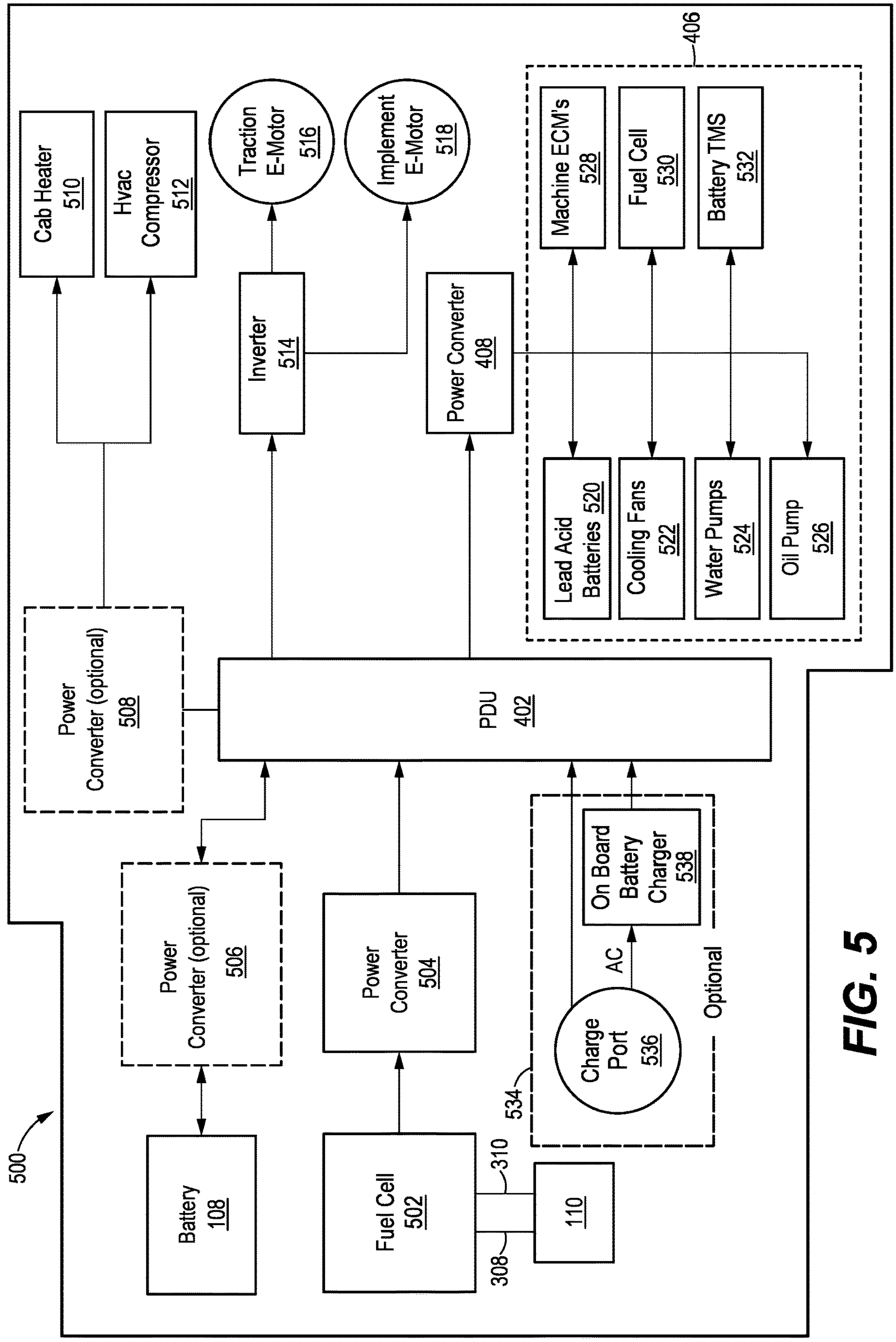
FIG. 5 is a schematic diagram of a second H2 fuel system, according to another embodiment of the present disclosure.

Now referring to FIG. 5, a schematic of a second H2 fuel system 500 is illustrated, according to another embodiment of the disclosure. The second H2 fuel system 500 may provide the H2 power unit 106 as a fuel cell 502 that converts hydrogen fuel into electric energy and supplies the electric energy to the PDU 402. The fuel cell 502 may be hydraulically connected to the H2 storage tank 110 for consuming the liquid hydrogen 300 via the liquid fuel line 310 and the gaseous hydrogen 304 via the boil-off fuel line 308 to produce the electric energy. The electrical energy is then distributed to a second power converter 504 to convert the electrical energy into a desired form or specific load prior to transferring the electrical energy to the PDU 402 for energy distribution in the work machine 100.

The fuel cell 502 may be one or a plurality of electromechanical devices that generate electricity through an electrochemical process using hydrogen as the fuel source, as generally known in the arts. The fuel cell 502 may comprise of a plurality of electrochemical cells that convert the chemical energy stored in the liquid hydrogen 300 and gaseous hydrogen 304 as fuel directly into electrical energy, with water as the primary byproduct. The fuel cell 502 may consist of an anode, a cathode, an electrolyte, and a catalyst, as generally known in the arts. The anode is where hydrogen gas is supplied to the fuel cell. At the anode, hydrogen molecules are split into protons (H+) and electrons (e-). The cathode is the site where oxygen from the air combines with electrons and protons that have traveled through an external circuit to form water. The electrolyte is a special material that allows for the migration of ions and/or charged particles, while preventing the mixing of hydrogen and oxygen gases. Protons can move through the electrolyte while electrons flow through an external circuit, creating an electric current. The catalysts is provided to facilitate the electrochemical reactions occurring at the anode and cathode. Platinum may be used as a catalyst in hydrogen fuel cells. When gaseous hydrogen 304 is supplied to the anode of the fuel cell 502 via the boil-off fuel line 308, it undergoes oxidation, releasing electrons. The protons produced during this process pass through the electrolyte to the cathode, while the electrons take an external path, creating an electric energy current that can be used to power various devices. At the cathode, oxygen from the air combines with the protons and electrons, forming water as a byproduct. The fuel cell 502 may be a 250-500V fuel cell.

The PDU 402 may then distribute the electrical energy to the battery 108 and the machine operational systems 406. A third power converter 506 may be provided between the battery 108 and the PDU 402, depending on the battery voltage vs a bus voltage. A fourth power converter 508 may be provided between the PDU 402 and electrically connected to both a cab heater 510 and a HVAC compressor 512, depending on the bus voltage versus a BTMS voltage (Battery Thermal Management System).

The first, second, third, and fourth power converters 408, 504, 506, 508 may be electromechanical devices such as an AC-to-DC converters, DC-to-DC converters, and the like that convert a source of electric current, such as direct current (DC), from one voltage level to another, as generally known in the arts. The first, second, third, and fourth power converters 408, 504, 506, 508 may be electromechanical power converters such as an electrical circuit that changes the electric energy from one form of electrical energy into the desired electrical energy form optimized for a specific load and may be used to increase or decrease the magnitude of the input voltage, invert polarity, or produce several output voltages of either the same polarity with the input, different polarity, or mixed polarities. The power levels may range from low levels in small batteries to very high levels for high-voltage power transmission. The first, second, third, and fourth power converters 408, 504, 506, 508 may convert received electric currents to at least 24V. In one embodiment, the first, second, third, and fourth power converters 408, 504, 506, 508 may each be a DC-to-DC Converter.

The PDU 402 may further distribute electric energy to an inverter 514 for providing electric energy to a traction e-motor 516 and an implement e-motor 518 in the work machine 100. The PDU 402 may further distribute electrical energy to the machine operational systems 406 which may include lead acid batteries 520, cooling fans 522, water pumps 524, oil pumps 526, machine engine control modules 528, fuel cell with a max 100A 530, and a battery thermal management system 532, each having a dedicated battery.

A battery charging system 534 may be provided in the H2 fuel system 500 electrically connected to the PDU 402. The battery charging system 534 may include a charge port 536 and an on-board battery charger 538 to condition the battery 108 during long sleep states and extreme temperatures. Long sleep states generally occur between jobs when there is significant risk of evaporating any stored cryogenic hydrogen in the work machine 100 due to venting, causing waste. Additionally, the additional charge from the battery charging system 534 may be used for cell conditioning/balancing of the battery 108, as generally known in the arts of battery technology.

Figure 6:
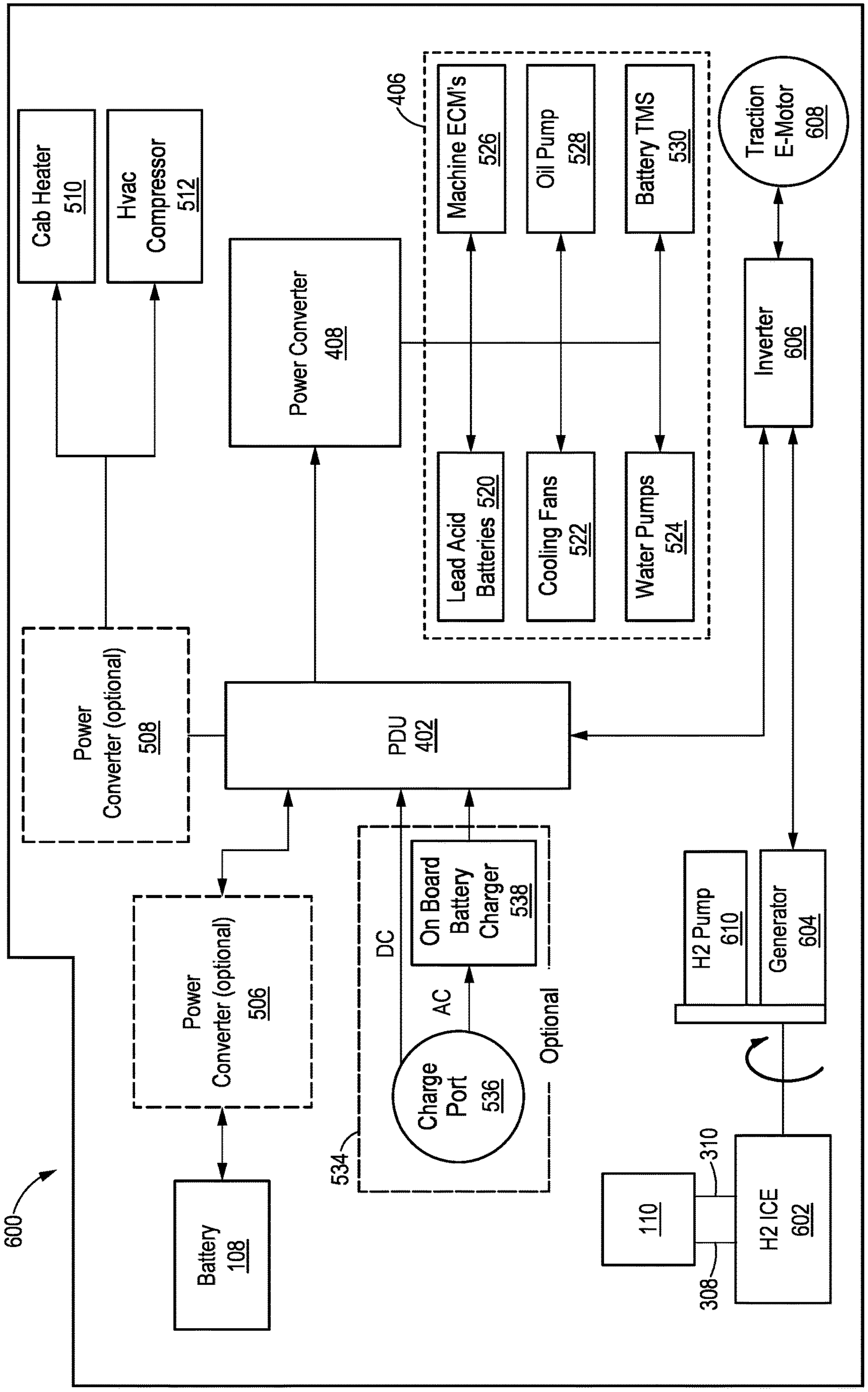
FIG. 6 is a schematic diagram of a third H2 fuel system, according to another embodiment of the present disclosure.

Now referring to FIG. 6, a schematic of a third H2 fuel system 600 is illustrated, according to another embodiment of the disclosure. The third H2 fuel system 600 may provide the H2 power unit 106 as a hydrogen internal combustion engine 602 ("H2 ICE 602") that converts hydrogen fuel into electric energy and supplies the electric energy to the PDU 402. The H2 ICE 602 may be hydraulically connected to the H2 storage tank 110 for consuming the liquid hydrogen 300, via the liquid fuel line 310, and the gaseous hydrogen 304, via the boil-off fuel line 308, to produce the electric power supplied to a generator 604. The generator 604 may be connected to a second inverter 606 which may be in further connection with the PDU 402. The second inverter 606 may be connected to a traction e-motor 608 of the work machine 100. The generator 604 may include or be connected to a hydrogen pump 610.

The H2 ICE 602 may include cylinders in which the gaseous hydrogen 304 may be injected into along with air. The hydrogen-air mixture may be ignited by a spark plug, causing a controlled explosion that drives pistons and generates mechanical energy, as generally known in the arts. The mechanical energy may then be converted into useful work, such as by turning a crankshaft. The exhaust from the H2 ICE contains water vapor as the primary emission.

The H2 Fuel System 400, second H2 Fuel System 500, and third H2 Fuel System 600 may be active while the work machine 100 is inactive or inoperable to avoid waste of gaseous hydrogen 304 boiling-off into the atmosphere. The H2 power unit 106 may be activated by the controller 404, while the work machine 100 is inactive, when the tank pressure sensor 412 detects a pressure exceeding the boil-off pressure threshold so that gaseous hydrogen 304 is transferred to the H2 power unit 106 for consumption to produce electrical energy and avoid a waste of hydrogen fuel.

INDUSTRIAL APPLICABILITY

In operation, the present disclosure may find applicability in many industries including, but not limited to, the automotive, construction, earth-moving, mining, and agricultural industries. Specifically, the systems, machines, and methods of the present disclosure may be used for hydrogen energy systems of other work machines including, but not limited to, excavators, backhoes, rope shovels, skid steers, wheel loaders, tractors, automobiles, trucks, cars, and similar machines. While the foregoing detailed description is made with specific reference to excavators, it is to be understood that its teachings may also be applied to other work machines.

Figure 7:
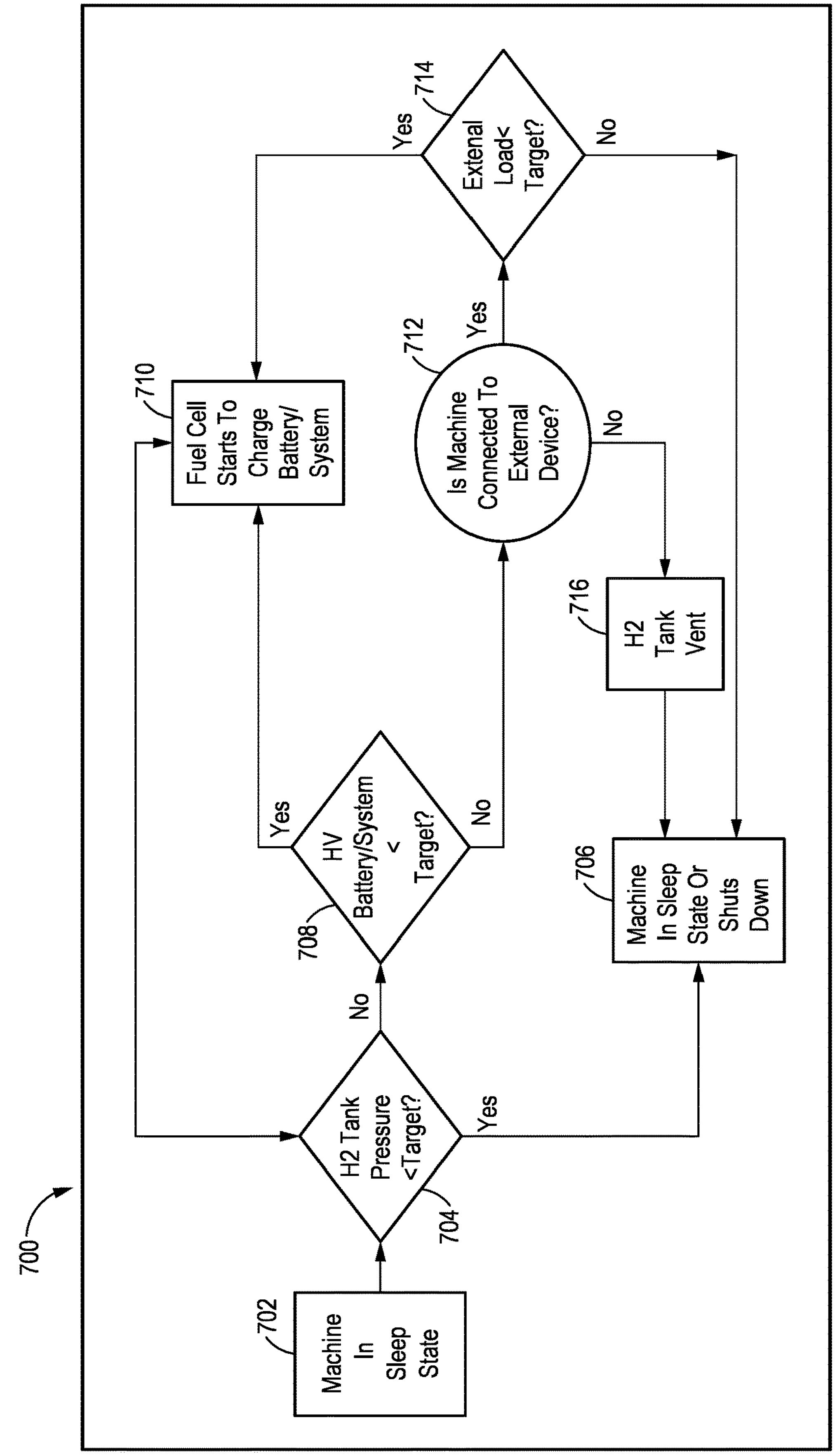
FIG. 7 is a flow-chart of an operation of the H2 fuel system, according to an embodiment of the present disclosure.

Now referring to FIG. 7, a H2 fuel conservation operation 700 of the H2 fuel system 400 is illustrated, according to one embodiment of the disclosure. The H2 fuel conservation operation 700 may also be used with the second H2 fuel system 500 and the third H2 fuel system 600. In an operation 702, the work machine 100 may be in a sleep state or inactive state. In an operation 704, the controller 404 determines whether the pressure in the H2 storage tank 110 is below the boil-off pressure threshold in the H2 storage tank 110 from signals received from the tank pressure sensor 412. In operation 704, the tank pressure sensor 412 may communicate with the controller 404 and the boil-off pressure relief valve 306 to release or vent the gaseous hydrogen 304 to the H2 power unit 106 when the pressure exceeds the boil-off pressure threshold.

In an operation 706, if the pressure is below the target of the boil-off pressure threshold, then the work machine 100 may remain in a sleep state or shut down. In an operation 708, if the pressure is above the boil-off pressure threshold in operation 704, then the controller 404 may determine if the remaining electrical power in the battery 108 is below a battery threshold. In an operation 710, when the battery 108 or the plurality of system batteries of the machine operational systems 406 are below the battery threshold, the H2 power unit 106 begins to charge the battery 108 or the plurality of system batteries of the machine operational systems 406. The battery threshold may be a max battery capacity.

When the battery 108 is above the battery threshold, then the controller 404 determines whether the work machine 100 is further connected to any external devices 426 requiring battery recharge, in an operation 712. If there are external devices 426 electrically connected to the work machine 100, then the controller 404 determines whether an external load of the external devices 426 is below an external load target, in an operation 714. If the external load is below the load target, then the H2 power unit 106 begins to charge the battery 108 by consuming the liquid hydrogen 300 and/or the gaseous hydrogen 304 in operation 710. If the external load of the external devices 426 are above the external load target, then the work machine 100 is put in a sleep state or shuts down, as in operation 706. The external devices 426 that may be connected to the work machine 100 such as a vehicle, another work machine, an electrical grid, or any device that requires charging. The electric energy produced may be utilized for powering one or more machine operational systems 406 of the work machine 100, recharging the battery 108 of the work machine 100, charging one or more batteries associated with other machines 428, charging a battery-based energy storage system 430, or powering an electrical grid 432. The electrical energy produced may recharge internal high-voltage and low-voltage batteries of the other machines 428, provide DC electric power connection to the external devices 426 such as recharging the batteries of light towers, cars, trucks, and for powering the components of the other machines 428 that require electric power. The electrical energy produced may provide AC power to the electrical grid 432, which may require additional hardware components provided internally or externally to the work machine 100, as generally known in the arts.

In operation 712, if the work machine 100 is not electrically connected to an external device, then, in an operation 716, the gaseous hydrogen 304 may be released or vented to the atmosphere via the second pressure relief valve 312 when the pressure exceeds an emergency pressure threshold, to avoid explosion. The gaseous hydrogen 304 may only be vented to the atmosphere when the battery 108 and the plurality of system batteries are at max capacity, the work machine 100 is not connected to any external devices or the external devices are at max battery capacity, and/or the pressure is below the emergency pressure threshold to allow for conservation of the gaseous hydrogen 304 for future use.

Figure 8:
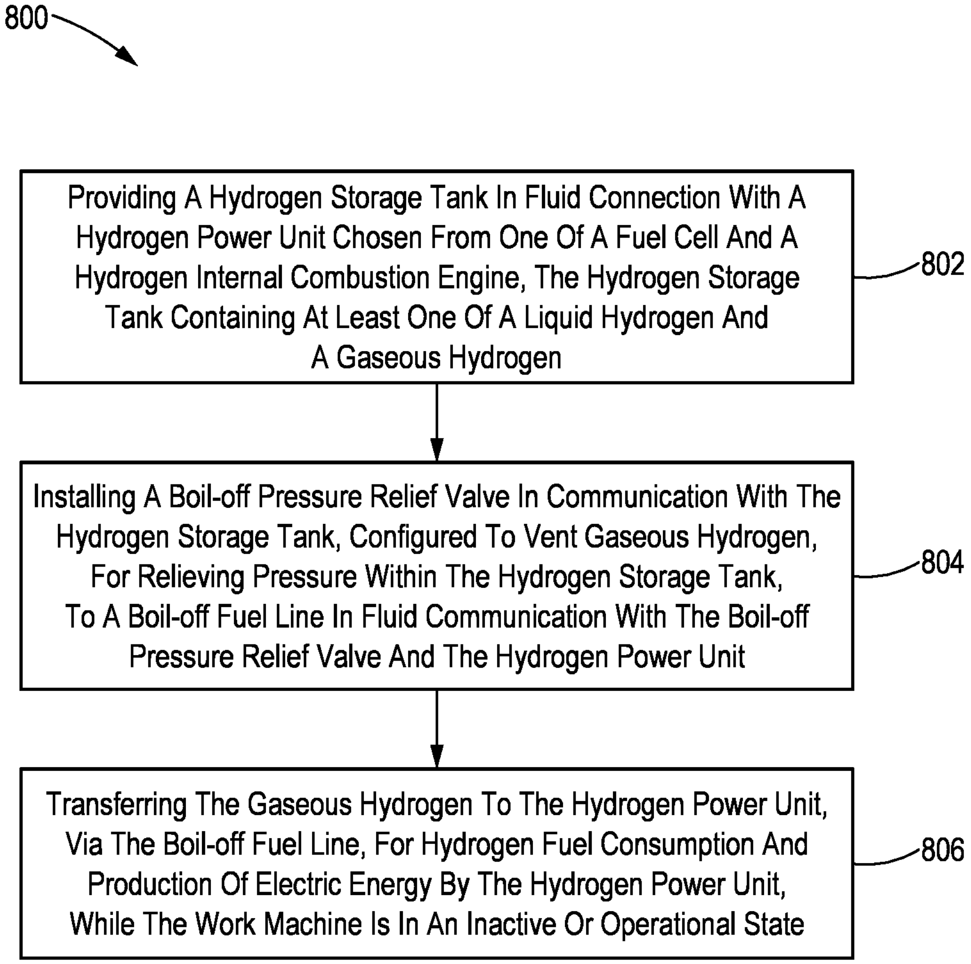
FIG. 8 is a flow-chart of a method of conserving hydrogen in the H2 fuel system of the work machine of FIG. 1, according to an embodiment of the present disclosure.

Now referring to FIG. 8, a method 800 of conserving hydrogen in the H2 fuel system 400 is illustrated, according to one embodiment of the disclosure. In a step 802, the H2 storage tank 110 is provided in fluid connection with the H2 power unit 106. The H2 power unit 106 may be chosen from one of a fuel cell and a hydrogen internal combustion engine. The H2 storage tank 110 is provided containing the liquid hydrogen 300 and/or the gaseous hydrogen 304, or it may be provided as cyro-compressed hydrogen.

In a step 804, the boil-off pressure relief valve 306 is installed in fluid communication with the H2 storage tank 110 and is configured to vent the gaseous hydrogen 304 to the boil-off fuel line 308, for relieving pressure within the H2 storage tank 110. In a step 806, the gaseous hydrogen 304 is transferred to the H2 power unit 106, via the boil-off fuel line 308, for hydrogen fuel consumption and production of electrical energy by the H2 power unit 106.

When batteries for the machine operational systems 406 have a load capacity to be charged, the electrical energy produced from the gaseous hydrogen 304 may be transferred to recharge the batteries for the machine operational systems 406, such as the lead acid batteries 520, the cooling fans 522, the water pumps 524, the oil pumps 526, the machine engine control modules 528, the fuel cell with a max 100A, and the battery thermal management system 532. If all the batteries for the machine operational systems 406 are at max capacity, the gaseous hydrogen 304 may be alternatively vented to the atmosphere via the second pressure relief valve 312, if the pressure exceeds an emergency pressure threshold.

From the foregoing, it can be seen that the technology disclosed herein has industrial applicability in a variety of settings such as, but not limited to the automotive, agricultural, construction, energy production, and mining industries that utilize work machines such as automobiles, cars, trucks, generators, excavators, backhoes, rope shovels, skid steers, wheel loaders, tractors, and similar work machines having a power unit or engine that uses hydrogen as fuel.

What is claimed is:

1. A hydrogen fuel system for a work machine comprising:

a hydrogen storage tank containing hydrogen, the hydrogen being at least one of a liquid hydrogen or a gaseous hydrogen;

a hydrogen power unit configured to consume the hydrogen from the hydrogen storage tank, the hydrogen power unit including at least one of a plurality of fuel cells or a hydrogen combustion engine;

a boil-off pressure relief valve in fluid communication with the hydrogen storage tank; and a tank pressure sensor in communication with the boil-off pressure relief valve, the boil-off pressure relief valve being configured to, when the tank pressure sensor detects a first pressure inside the hydrogen storage tank that exceeds a boil-off pressure threshold, vent the gaseous hydrogen to a boil-off fuel line fluidly connected to the hydrogen power unit, while the work machine is in an inactive state.

2. The hydrogen fuel system of claim 1, wherein the boil-off fuel line is configured to transfer the gaseous hydrogen to the hydrogen power unit for consumption of the gaseous hydrogen to produce an electrical energy for at least one of: powering one or more machine operational systems of the work machine, recharging a battery of the work machine, charging one or more batteries associated with other machines, charging a battery-based energy storage system, or powering an electrical grid.

3. The hydrogen fuel system of claim 2, wherein the electrical energy is a first electrical energy further comprising:

a power converter in connection with the hydrogen power unit, the power converter configured to convert the electrical energy into a second electrical energy; and a power distribution unit in connection with the power converter, wherein the power distribution unit transfers electric power, based on the second electrical energy, to the one or more machine operational systems.

4. The hydrogen fuel system of claim 3, wherein the gaseous hydrogen is vented via the boil-off pressure relief valve to the plurality of fuel cells, the plurality of fuel cells consume the gaseous hydrogen to produce the first electrical energy, the first electrical energy is subsequently converted by the power converter, to the second electrical energy, and the second electrical energy is delivered to the power distribution unit.

5. The hydrogen fuel system of claim 2, further comprising a second pressure relief valve on the hydrogen storage tank for venting a portion of the gaseous hydrogen to atmosphere when the tank pressure sensor detects a second pressure inside the hydrogen storage tank that exceeds an emergency pressure threshold that is greater than the boil-off pressure threshold.

6. The hydrogen fuel system of claim 4, wherein the hydrogen storage tank includes an inner tank containing the hydrogen, an outer tank surrounding the inner tank and forming an annular space between the inner tank and the outer tank, and at least one of:

the inner tank made of a material selected from the group consisting of high-strength steel, high-strength carbon-fiber, and high-strength aluminum alloy;

the outer tank made of a material selected from the group consisting of high-strength steel, high-strength carbon-fiber, and high-strength aluminum alloy;

an insulation material provided in the annular space and being one of multiple layers of high-performance insulation materials, aerogel blankets, and vacuum-sealed panels;

a fluid level sensor positioned within the inner tank and configured to monitor and provide real-time feedback on a volume of cryogenic fluid stored within the inner tank;

an active cooling device integrated with the outer tank and configured to extract heat from the hydrogen storage tank and maintain a temperature of the inner tank at cryogenic levels to avoid excess gaseous hydrogen; or an integrated safety system including temperature sensors, leak detectors, and emergency shut-off mechanisms, configured to ensure safe operation.

7. The hydrogen fuel system of claim 1, wherein the work machine is one of an excavator, a truck, a backhoe, a rope shovel, a skid steer, a wheel loader, a tractor, and a generator.

8. The hydrogen fuel system of claim 2, wherein the one or more machine operational systems includes an ignition system, a fuel injection system, an oil transport system, a transmission, a throttle system, a power system, a braking system, a cooling system, a navigation system, a lighting system, an alarm system, a battery system, lead acid batteries, cooling fans, water pumps, oil pumps, machine engine control modules, a fuel cell, or a battery thermal management system.

9. A work machine comprising:

a frame;

ground engaging elements supporting the frame;

a battery supported by the frame;

a plurality of machine operational systems associated with a plurality of system batteries;

a hydrogen fuel system including:

a hydrogen storage tank mounted in the frame and containing hydrogen, the hydrogen being at least one of a liquid hydrogen or a gaseous hydrogen;

a hydrogen power unit mounted in the frame and in fluid connection with the hydrogen storage tank and configured to consume the hydrogen, the hydrogen power unit including at least one of a plurality of fuel cells or a hydrogen combustion engine;

a tank pressure sensor in the hydrogen storage tank;

a controller in communication with the tank pressure sensor and the plurality of machine operational systems; and a boil-off pressure relief valve in fluid communication with the hydrogen storage tank and in electrical communication with the tank pressure sensor, the boil-off pressure relief valve being configured to, when the tank pressure sensor detects a pressure inside the hydrogen storage tank that exceeds a boil-off pressure threshold, vent the gaseous hydrogen to a boil-off fuel line fluidly connected to the hydrogen power unit, wherein the boil-off fuel line is configured to transfer the gaseous hydrogen to the hydrogen power unit for consumption of the gaseous hydrogen to produce electric energy for charging at least one of the battery or the plurality of system batteries while the work machine is in an inactive state.

10. The work machine of claim 9, the hydrogen fuel system further comprising:

a second pressure relief valve on the hydrogen storage tank for venting gaseous hydrogen when the pressure in the hydrogen storage tank exceeds an emergency pressure threshold that is greater than the boil-off pressure threshold; and a liquid fuel line in fluid connection with the hydrogen storage tank and the hydrogen power unit to transfer the liquid hydrogen for fuel consumption by the hydrogen power unit.

11. The work machine of claim 10, the hydrogen fuel system further including:

a power converter in connection with the hydrogen power unit, the power converter configured to convert the electric energy into a second electric energy; and a power distribution unit in connection with the hydrogen power unit, wherein the power distribution unit transfers electric power, from the second electric energy, to the plurality of system batteries of the plurality of machine operational systems.

12. The work machine of claim 11, wherein: the gaseous hydrogen is vented via the boil-off pressure relief valve to the plurality of fuel cells, the plurality of fuel cells consume the gaseous hydrogen to produce the electric energy, the electric energy is subsequently converted to the second electric energy by the power converter, and the second electric energy is delivered for at least one of: powering one or more machine operational systems of the work machine, recharging a battery of the work machine, charging one or more batteries associated with other machines, charging a battery-based energy storage system, or powering an electrical grid.

13. The work machine of claim 9, wherein the hydrogen storage tank further includes an inner tank containing the hydrogen, an outer tank surrounding the inner tank and forming an annular space between the inner tank and the outer tank, and at least one of:

the inner tank made of material selected from the group consisting of high-strength steel, high-strength carbon-fiber, and high-strength aluminum alloy;

the outer tank made of material selected from the group consisting of high-strength steel, high-strength carbon-fiber, and high-strength aluminum alloy;

an insulation material provided in the annular space and being one of one multiple layers of high-performance insulation materials, aerogel blankets, and vacuum-sealed panels;

a fluid level sensor positioned within the inner tank and configured to monitor and provide real-time feedback on a volume of cryogenic fluid stored within the inner tank;

an active cooling device integrated with the outer tank and configured to extract heat from the hydrogen storage tank and maintain a temperature of the inner tank at cryogenic levels to avoid excess gaseous hydrogen; or an integrated safety system including temperature sensors, leak detectors, and emergency shut-off mechanisms, configured to ensure safe operation.

14. The work machine of claim 9, wherein the work machine is one of an excavator, a truck, a backhoe, a rope shovel, a skid steer, a wheel loader, a tractor, or a generator.

15. The work machine of claim 14, wherein a first machine operational system, of the plurality of machine operational systems, is one selected from the group consisting of: an ignition system, a fuel injection system, an oil transport system, a transmission, a throttle system, a power system, a braking system, a cooling system, a navigation system, a lighting system, an alarm system, a battery system, lead acid batteries, cooling fans, water pumps, oil pumps, machine engine control modules, a fuel cell, and a battery thermal management system.

16. A method for conserving hydrogen fuel in a hydrogen fuel system for a work machine, the method comprising:

providing a hydrogen storage tank in fluid connection with a hydrogen power unit including at least one of a fuel cell or a hydrogen internal combustion engine, the hydrogen storage tank containing at least one of a liquid hydrogen or a gaseous hydrogen, wherein a boil-off pressure relief valve is in communication with the hydrogen storage tank and configured to vent gaseous hydrogen, for relieving pressure within the hydrogen storage tank, to a boil-off fuel line in fluid communication between the boil-off pressure relief valve and the hydrogen power unit; and transferring the gaseous hydrogen to the hydrogen power unit, via the boil-off fuel line, for hydrogen fuel consumption and production of electric power by the hydrogen power unit, while the work machine is in an inactive state.

17. The method of claim 16, the method further comprising:

monitoring the pressure in the hydrogen storage tank, via a tank pressure sensor in the hydrogen storage tank in communication with a controller and the boil-off pressure relief valve;

venting the gaseous hydrogen, via the boil-off pressure relief valve, when the controller receives a pressure signal from the tank pressure sensor that the pressure within the hydrogen storage tank exceeds a boil-off pressure threshold; and consuming the gaseous hydrogen, via the hydrogen power unit, to produce electric energy.

18. The method of claim 17, the method further comprising:

transferring the electric energy from the hydrogen power unit to a power converter;

converting a form of the electric energy to a second electrical energy, via the power converter; and transferring the second electrical energy to a power distribution unit in communication with a plurality of machine operational systems of the work machine for at least one of: charging one or more batteries in the work machine or powering the plurality of machine operational systems.

19. The method of claim 18, wherein the hydrogen storage tank further includes an inner tank containing the hydrogen, and an outer tank surrounding the inner tank and forming an annular space between the inner tank and the outer tank, the method further comprising:

integrating a cryocooler device with the outer tank, configured to extract heat from the hydrogen storage tank and maintain a temperature of the inner tank at cryogenic levels to mitigate cryogenic fluid boil-off;

installing a second pressure relief valve on the hydrogen storage tank for venting gaseous hydrogen to an atmosphere when the tank pressure sensor detects the pressure inside the hydrogen storage tank exceeding an emergency pressure threshold being greater than the boil-off pressure threshold;

incorporating an insulation system comprising high-performance insulation materials within the annular space, designed to minimize thermal transfer into the inner tank and mitigate cryogenic fluid boil-off; and implementing an integrated safety system comprising temperature sensors, leak detectors, an emergency shut-off mechanisms to ensure safe operation of the hydrogen fuel system by automatically isolating the hydrogen and activating a fire suppression system upon detecting a fire or abnormal operating conditions.

20. The method of claim 19, the method further comprising:

providing the work machine as one of an excavator, a truck, a backhoe, a rope shovel, a skid steer, a wheel loader, a tractor, or a generator; and selecting the plurality of machine operational systems from the group consisting of: an ignition system, a fuel injection system, an oil transport system, a transmission, a throttle system, a power system, a braking system, a cooling system, a navigation system, a lighting system, an alarm system, a battery system, lead acid batteries, cooling fans, water pumps, oil pumps, machine engine control modules, a fuel cell stack, and a battery thermal management system.

* * * * *